(12) United States Patent
Wei et al.

(10) Patent No.: US 12,061,342 B2
(45) Date of Patent: Aug. 13, 2024

(54) TWO-DIMENSIONAL OPTICAL WAVEGUIDE, VIRTUAL AND REAL LIGHT WAVE BEAM COMBINER, AND AR APPARATUS

(71) Applicant: HANGZHOU GUANGLI TECHNOLOGY CO., LTD., Zhejiang (CN)

(72) Inventors: Yizhen Wei, Zhejiang (CN); Daru Chen, Zhejiang (CN); Zhuopeng Zhang, Zhejiang (CN)

(73) Assignee: HANGZHOU GUANGLI TECHNOLOGY CO., LTD., Zhejiang (CN)

( * ) Notice: Subject to any disclaimer, the term of this patent is extended or adjusted under 35 U.S.C. 154(b) by 358 days.

(21) Appl. No.: 17/620,766

(22) PCT Filed: Nov. 20, 2020

(86) PCT No.: PCT/CN2020/130321
§ 371 (c)(1),
(2) Date: Dec. 20, 2021

(87) PCT Pub. No.: WO2021/120981
PCT Pub. Date: Jun. 24, 2021

(65) Prior Publication Data
US 2022/0357578 A1    Nov. 10, 2022

(30) Foreign Application Priority Data

Dec. 16, 2019    (CN) .......................... 201911294198.8

(51) Int. Cl.
*G02B 27/01*    (2006.01)
*F21V 8/00*    (2006.01)

(52) U.S. Cl.
CPC ....... G02B 27/0172 (2013.01); G02B 6/0016 (2013.01); G02B 6/0036 (2013.01); *G02B 2027/0178* (2013.01)

(58) Field of Classification Search
CPC ................ G02B 6/0016; G02B 6/0036; G02B 27/0172; G02B 27/0081; G02B 27/4205;
(Continued)

(56) References Cited

U.S. PATENT DOCUMENTS 10,331,207 B1    6/2019  Simmons
10,345,519 B1 *  7/2019  Miller ................... G02B 6/124
(Continued)

FOREIGN PATENT DOCUMENTS

BR    102013018869 A2    8/2015
CN    1715996 A          1/2006
(Continued)

OTHER PUBLICATIONS

International Search Report for PCT/CN2020/130321 mailed Feb. 2, 2021, ISA/CN.
(Continued)

*Primary Examiner* — Michael P Mooney
(74) *Attorney, Agent, or Firm* — Yue (Robert) Xu; Apex Attorneys at Law, LLP (57) ABSTRACT

A two-dimensional optical waveguide, a virtual and real optical beam combiner, and an AR device. A surface of a substrate is divided into an in-coupling region, a folding area, and an out-coupling region. The folding area is provided with a defect area and at least two line defects, and the defect area extends from the in-coupling region toward a side away from the in-coupling region. The line defects have one end in contact with the defect area, and another end extending to the out-coupling region. The at least two line defects are distributed along an axis of the defect area. A
(Continued)

photonic crystal is provided along a periphery of the defect area and the line defects. The photonic crystals includes multiple scattering rods having an axis perpendicular to a surface of the folding area.

20 Claims, 4 Drawing Sheets

(58) Field of Classification Search
CPC .... G02B 2027/0178; G02B 2027/0125; G02B 1/005; G02B 5/0252
See application file for complete search history.

(56) References Cited

U.S. PATENT DOCUMENTS

| | | |
|---|---|---|
| 2006/0132914 A1 | 6/2006 | Weiss et al. |
| 2009/0087141 A1 | 4/2009 | Kim |
| 2010/0226609 A1 | 9/2010 | Tokushima |
| 2016/0139437 A1 | 5/2016 | Dmitriev et al. |
| 2017/0299865 A1 | 10/2017 | Vallius et al. |
| 2018/0128997 A1 | 5/2018 | Dmitriev et al. |
| 2018/0210205 A1 | 7/2018 | Grey et al. |
| 2019/0187474 A1 | 6/2019 | Bhargava et al. |
| 2021/0199853 A1 | 7/2021 | Chen |

FOREIGN PATENT DOCUMENTS

| | | |
|---|---|---|
| CN | 207037130 U | 2/2018 |
| CN | 108152886 A | 6/2018 |
| CN | 108681067 A | 10/2018 |
| CN | 108873324 A | 11/2018 |
| CN | 109073884 A | 12/2018 |
| CN | 110865460 A | 3/2020 |
| CN | 210776046 U | 6/2020 |
| CN | 111954989 A | 11/2020 |
| DE | 102009030338 A1 | 12/2010 |
| DE | 102018201525 A1 | 7/2019 |
| JP | 2003279763 A | 10/2003 |
| JP | 2017528739 A | 9/2017 |
| KR | 20090032674 A | 4/2009 |

OTHER PUBLICATIONS

The Japanese Notice of allowance mailed Jan. 13, 2023 for JP2021-577383.
The Korean 1st Office Action issued on Mar. 7, 2024 for KR10-2022-7011068.
The 1st Office Action regarding Chinese Patent Application No. CN201911294198.8, Mailing date: Apr. 24, 2024. English Translation Provided by http://globaldossier.uspto.gov.

* cited by examiner

TWO-DIMENSIONAL OPTICAL WAVEGUIDE, VIRTUAL AND REAL LIGHT WAVE BEAM COMBINER, AND AR APPARATUS

The present application is the U.S. national phase of International application No. PCT/CN2020/130321, titled "TWO-DIMENSIONAL OPTICAL WAVEGUIDE, VIRTUAL AND REAL LIGHT WAVE BEAM COMBINER, AND AR APPARATUS", filed on Nov. 20, 2020, which claims the priority to Chinese Patent Application No. 201911294198.8, titled "TWO-DIMENSIONAL OPTICAL WAVEGUIDE, VIRTUAL AND REAL OPTICAL BEAM COMBINER AND AR DEVICE", filed with the China National Intellectual Property Administration on Dec. 16, 2019, both of which are incorporated herein by reference in their entirety.

FIELD

The present disclosure relates to the technical field of augmented reality, and in particular to a two-dimensional optical waveguide, a virtual and real optical beam combiner and an AR device.

BACKGROUND

With the in-depth development of information technology, Augmented Reality (AR) technology has gradually been recognized and accepted by people, and related technology progress and product development have received extensive attention. At present, more and more technology giants have entered the AR industry through acquisition, investment, and self-research, such as Apple, Microsoft, Google, Facebook, Huawei, etc. AR devices are capable of superimposing and fusing virtual content in the real world, so that human eyes may receive both virtual image information and real image information at the same time, which is further applied to a wide range of sectors such as entertainment, education, industry, transportation, medical treatment, and tourism. The core component of the AR device is a virtual and real optical beam combiner (Combiner), which is configured to form a virtual image on retina of the human eye while allowing light of the real world to pass through to realize virtual-real fused AR display. Traditional geometric optical elements such as prism, semi-transparent and semi-reflective lens, free-form surface lens, arrayed waveguide may be adopted, as well as diffractive optical elements such as surface relief optical waveguide, holographic optical waveguide, etc. Diffractive optical waveguide display technology uses diffraction gratings to realize the incidence, transition and emergence of light, and realizes light transmission based on the principle of total reflection, which enables compact structure and lightness of element and is currently the most competitive core optical element of the AR device.

At present, a diffractive optical waveguide used in an AR device is mainly divided into an in-coupling region, a folding area and an out-coupling region. Different gratings are made on different areas of an optical waveguide glass substrate to control the propagation direction of light. The in-coupling region is small in size, which is configured to couple a projection beam into the optical waveguide; the folding area is larger in size, which mainly realizes the pupil expansion function; the out-coupling region is the largest in size, which is configured to output beam to human eyes. However, in the related art, the efficiency of light redirection and exit pupil expansion is low, resulting in low imaging efficiency. Therefore, a technical issue to be addressed presently by those skilled in the art is to provide a two-dimensional optical waveguide with high efficiency of light redirection and exit pupil expansion.

SUMMARY

An objective of the present disclosure is to provide a two-dimensional optical waveguide with high efficiency of light redirection and exit pupil expansion; the present disclosure further provides a virtual and real optical beam combiner and an AR device with high efficiency of light redirection and exit pupil expansion.

In order to solve the above technical problems, a two-dimensional optical waveguide is provided according to the present disclosure, including a substrate, an in-coupling grating, and an out-coupling grating;

where a surface of the substrate is divided into an in-coupling region, a folding area, and an out-coupling region, the folding area is provided with a defect area and at least two line defects, the defect area extends from the in-coupling region to a side away from the in-coupling region, an end of the line defect is in contact with the defect area, the other end of the line defect extends to the out-coupling region, and the at least two line defects are distributed along an axis of the defect area;

a photonic crystal area is provided between adjacent line defects in the folding area, between the at least two line defects and the defect area, between the at least two line defects and an edge of the folding area, and between the defect area and an edge of the folding area, the photonic crystal area is provided with multiple scattering rods to form a photonic crystal, and an axis of each of the scattering rods is perpendicular to a surface of the folding area; and the in-coupling grating is located on a surface of the in-coupling region, and the out-coupling grating is located on a surface of the out-coupling region.

Optionally, a width of the defect area gradually decreases along a direction from the in-coupling region to the side away from the in-coupling region.

Optionally, the in-coupling region is located at an edge section on a side of the surface of the substrate, the defect area extends from the edge section on the side of the surface of the substrate to an edge section on the other side of the surface of the substrate, the out-coupling region includes a first out-coupling region and a second out-coupling region arranged opposite to each other about the axis of the defect area, the at least two line defects include a first line defect and a second line defect, the first line defect extends from the defect area to the first out-coupling region, and the second line defect extends from the defect area to the second out-coupling region.

Optionally, the at least two line defects are any one or any combination of the following:

straight-line-shaped line defects perpendicular to the axis of the defect area, oblique-line-shaped line defects non-perpendicular to the axis of the defect area and polyline-shaped line defects.

Optionally, the in-coupling region is located at an edge section on a side of the surface of the substrate, the out-coupling region is located on the other side of the surface of the substrate, the defect area extends from the in-coupling region to the out-coupling region, the at least two line defects include a first line defect located at a side of the defect area and a second line defect located at the other side of the defect area, and the at least two line defects are polyline-shaped line defects.

Optionally, the in-coupling region is located at a corner edge section on a side of the surface of the substrate, and the out-coupling region is located at a side of the defect area.

Optionally, the at least two line defects are any one or any combination of the following:

straight-line-shaped line defects perpendicular to the axis of the defect area, oblique-line-shaped line defects non-perpendicular to the axis of the defect area, and polyline-shaped line defects.

Optionally, the in-coupling region is located at a corner edge section on a side of the surface of the substrate, the out-coupling region is located on the other side of the surface of the substrate, the defect area extends from the in-coupling region to the out-coupling region, and the at least two line defects are polyline-shaped line defects.

Optionally, a length of the defect area ranges from 5 mm to 50 mm, inclusive.

Optionally, a width of the line defect ranges from 0.1 mm to 5 mm, inclusive.

Optionally, the out-coupling region is overlapped with the folding area.

A virtual and real optical beam combiner is further provided according to the present disclosure, including the two-dimensional optical waveguide according to any one of the above.

An AR device is further provided according to the present disclosure, including the two-dimensional optical waveguide according to any one of the above.

A two-dimensional optical waveguide is provided according to the present disclosure, where a surface of the substrate is divided into an in-coupling region, a folding area, and an out-coupling region; the folding area is provided with an defect area and at least two line defects, the defect area extends from the in-coupling region to a side away from the in-coupling region, an end of the line defect is in contact with the defect area, the other end of the line defect extends to the out-coupling region, and at least two line defects are distributed along an axis of the defect area; a photonic crystal area is provided between adjacent line defects in the folding area, between the at least two line defects and the defect area, between the at least two line defects and an edge of the folding area, and between the defect area and an edge of the folding area; the photonic crystal area is provided with multiple scattering rods to form a photonic crystal, and an axis of each of the scattering rods is perpendicular to a surface of the folding area.

Due to the existence of the photonic crystal, the defect area and the line defects will form light guide branches, and the light transmitted to the substrate through the in-coupling region can be transmitted to the out-coupling region through the defect area and the line defects to realize the pupil expansion function. The photonic crystal is capable of completely prohibiting the propagation of light, so that the light may be bent and transmitted at a large angle and in a low-loss way, along the light guide branches, so that the two-dimensional optical waveguide has a higher efficiency of light redirection and exit pupil expansion.

A virtual and real optical beam combiner and an AR device are further provided according to the present disclosure, which also have the above beneficial effects, and are not repeated herein.

BRIEF DESCRIPTION OF THE DRAWINGS

For more clearly illustrating the technical solutions according to the embodiments of the present disclosure or the conventional technology, the drawings to be used in the description of the embodiments or the conventional technology are briefly described hereinafter. Apparently, the drawings described below illustrate only some embodiments of the present disclosure. Other drawings may be obtained by those skilled in the art according to these drawings without any creative effort.

In the Figures: 1. substrate, 2. in-coupling region, 3. folding area, 31. defect area, 32. line defect, 321. first line defect, 322. second line defect, 33. scattering rod, 4. out-coupling region, 41. first out-coupling region, 42. second out-coupling region.

DETAILED DESCRIPTION OF THE EMBODIMENTS

The present disclosure is to provide a two-dimensional optical waveguide. In the related art, firstly, a folding area realizes the function of light redirection and exit pupil expansion by a diffractive grating formed on a surface of the waveguide substrate, which has a low light redirection and exit pupil expansion efficiency and hence greatly reduces the overall diffraction efficiency of the diffractive optical waveguide; secondly, in a one-dimensional grating structure, a diffractive grating in the folding area cannot overlap with a diffractive grating in an out-coupling region, which limits the proportion of a display area of the diffractive optical waveguide; thirdly, a diffractive grating is only capable of providing optical path control by reflection or transmission, which limits the flexibility and aesthetics of the optical path design of the diffractive optical waveguide.

A two-dimensional optical waveguide is provided according to the present disclosure, where a surface of the substrate is divided into an in-coupling region, a folding area, and an out-coupling region; the folding area is provided with an defect area and at least two line defects, the defect area extends from the in-coupling region to a side away from the in-coupling region, an end of the line defect is in contact with the defect area, the other end of the line defect extends to the out-coupling region, and at least two line defects are distributed along the axis of the defect area; a photonic crystal area is provided between adjacent line defects in the folding area, between the at least two line defects and the defect area, between the at least two line defects and an edge of the folding area, and between the defect area and an edge of the folding area; the photonic crystal area is provided with multiple scattering rods to form a photonic crystal, and an axis of the scattering rod is perpendicular to a surface of the folding area.

Due to the existence of the photonic crystal, the defect area and the line defects will form light guide branches, and the light transmitted to the substrate through the in-coupling region can be transmitted to the out-coupling region through the defect area and the line defects to realize the pupil expansion function. The photonic crystal is capable of completely prohibiting the propagation of light, so that the light may be bent and transmitted at a large angle and in a low-loss way, along the light guide branches, so that the two-dimensional optical waveguide has a higher efficiency of light redirection and exit pupil expansion.

In order to enable those skilled in the art to better understand the solution of the present disclosure, the present disclosure is described in detail hereinafter in conjunction with the drawings and the embodiments. It is apparent that the described embodiments are only some embodiments of the present disclosure rather than all the embodiments. Based on the embodiments of the present disclosure, all other embodiments acquired by those skilled in the art without any creative effort fall within the protection scope of the present disclosure.

Figure 1:
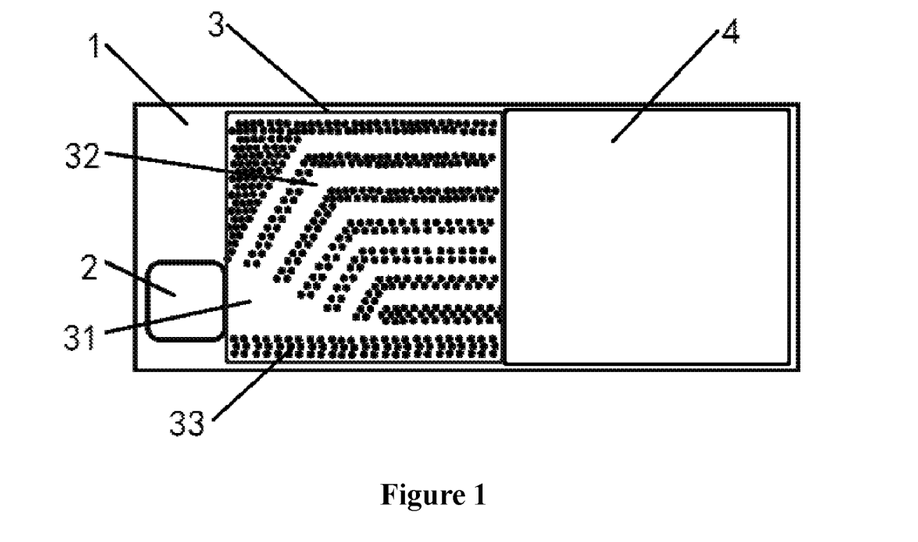
FIG. 1 is a schematic structural diagram of a two-dimensional optical waveguide according to an embodiment of the present disclosure.
Figure 2:
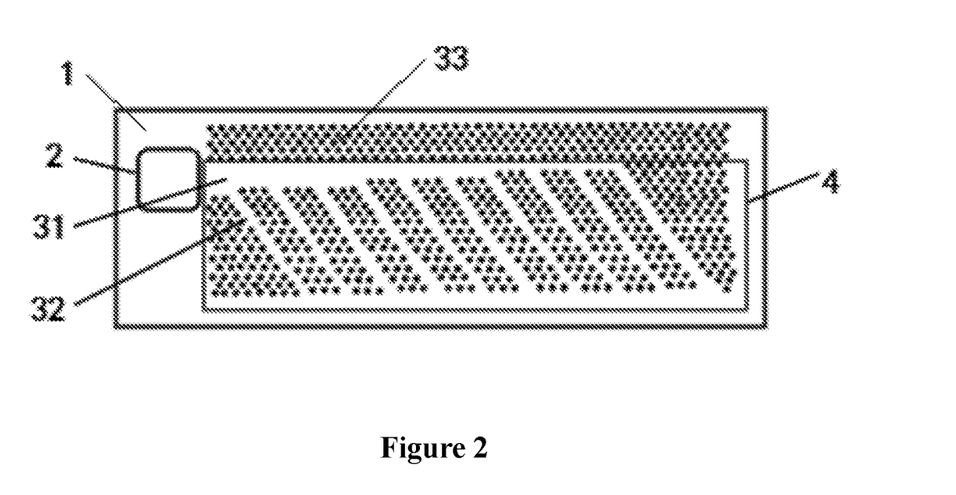
FIG. 2 is a schematic structural diagram of a first specific two-dimensional optical waveguide according to an embodiment of the present disclosure.

Reference is made to FIG. 1 and FIG. 2. FIG. 1 is a schematic structural diagram of a two-dimensional optical waveguide according to an embodiment of the present disclosure; FIG. 2 is a schematic structural diagram of a first specific two-dimensional optical waveguide according to an embodiment of the present disclosure.

Referring to FIG. 1, in an embodiment of the present disclosure, the two-dimensional optical waveguide includes a substrate 1, an in-coupling grating, and an out-coupling grating; where a surface of the substrate 1 is divided into an in-coupling region 2, a folding area 3, and an out-coupling region 4; the folding area 3 is provided with a defect area 31 and at least two line defects 32, the defect area 31 extends from the in-coupling region 2 to a side away from the in-coupling region 2, an end of the line defect 32 is in contact with the defect area 31, the other end of the line defect 32 extends to the out-coupling region 4, and at least two line defects 32 are distributed along the axis of the defect area 31; a photonic crystal area is provided between adjacent line defects 32 in the folding area 3, between the at least two line defects 32 and the defect area 31, between the at least two line defects 32 and an edge of the folding area 3, and between the defect area 31 and an edge of the folding area 3, the photonic crystal area is provided with multiple scattering rods 33 to form a photonic crystal, and an axis of the scattering rod 33 is perpendicular to a surface of the folding area 3; the in-coupling grating is located on a surface of the in-coupling region 2, and the out-coupling grating is located on a surface of the out-coupling region 4.

The substrate 1 is a main structure of the two-dimensional optical waveguide. In the embodiment of the present disclosure, the substrate 1 is generally in the shape of sheet. For the specific material of the substrate 1, reference may be made to the conventional art, which is not repeated herein. Ambient light is transmitted into the substrate 1 through the in-coupling region 2, and after a pupil expansion transmission by the folding area 3, it is transmitted out of the substrate 1 through the out-coupling region 4. It should be noted that the in-coupling region 2, the folding area 3, and the out-coupling region 4 are usually located on the same surface of the substrate 1.

An in-coupling grating is provided on a surface of the in-coupling region 2, and an out-coupling grating is provided on a surface of the out-coupling region 4. Ambient light is transmitted into the substrate 1 through the in-coupling grating, and correspondingly, light subjected to pupil expansion by the folding area 3 is transmitted out of the two-dimensional optical waveguide through the out-coupling grating. For the specific structure of the in-coupling grating and the out-coupling grating, reference may be made to the conventional art, which is not repeated herein.

The folding area 3 is divided into a defect area 31, line defects 32, and a photonic crystal area. Generally, only one defect area 31 is provided in the folding area 3, where an end of the defect area 31 is in contact with the in-coupling region 2 and the defect area 31 extends from the in-coupling region 2 to a side of a surface of the substrate 1 away from the in-coupling region 2. Correspondingly, the ambient light first extends outward from the in-coupling region 2 along the defect area 31. It should be noted that, in order to ensure that the light transmitted into the substrate 1 through the in-coupling region 2 can be completely transmitted into the defect area 31, a width of the end of the defect area 31 which is in contact with the in-coupling region 2 is usually the same as a width of the in-coupling region 2. Specifically, the width of the in-coupling region 2 generally ranged from 1 mm to 20 mm, inclusive; correspondingly, the width of the end of the defect area 31 which is in contact with the in-coupling region 2 generally ranges from 1 mm to 20 mm, inclusive. Specifically, in an embodiment of the present disclosure, a length of the defect area 31 generally ranges from 5 mm to 50 mm, inclusive, so as to conform to the wearing habit of a user.

At least two line defects 32 are provided in the folding area 3, where an end of the line defect 32 is in contact with the defect area 31, the other end of the line defect 32 extends to the out-coupling region 4 and is in contact with the out-coupling region 4, so that the line defects 32 are specifically configured to diffuse the light transmitted in the defect area 31 and transmit the diffused light to the out-coupling region 4. The line defects 32 are distributed along an axis of the defect area 31. Generally, an axis of the line defect 32 is at a certain angle with the axis of the defect area 31. When light enters the line defects 32 from the defect area 31, it usually turns by a large angle to realize the pupil expansion function. It should be noted that the line defects 32 are generally located at the same side or at both sides of the defect area 31. When light extends from the in-coupling region 2 to a side away from the in-coupling region 2 along the defect area 31, light of different powers are specifically transmitted to respective line defects 32 to realize the pupil expansion function, that is, light transmitted in different line defects 32 generally have mutually different powers. Besides, in order to facilitate the setting of the folding area 3, line defects 32 located at the same side of the defect area 31 are generally parallel to each other.

A photonic crystal area is provided in the folding area 3. Specifically, the photonic crystal area is provided between adjacent line defects 32 in the folding area 3, between the at least two line defects 32 and the defect area 31, between the at least two line defects 32 and an edge of the folding area 3, and between the defect area 31 and an edge of the folding area 3. That is, in the folding area 3, an area that is not provided with the line defects 32 and the defect area 31 is generally defined as the photonic crystal area. It should be noted that, in the embodiment of the present disclosure, the defect area 31 and the line defects 32 are generally formed by different divisions of photonic crystal areas, that is, both sides of the axis of the defect area 31 are provided with a photonic crystal area to form the defect area 31, and, both sides of the axis of the line defect 32 are provided with a photonic crystal area to form the line defect 32. Specifically, in an embodiment of the present disclosure, a width of the line defect 32 generally ranges from 0.1 mm to 5 mm, inclusive, so as to ensure that the light pupil expansion area has an effective pupil expansion function.

In an embodiment of the present disclosure, the photonic crystal area is provided with multiple scattering rods 33 to form a photonic crystal, and an axis of the scattering rod 33 is perpendicular to a surface of the folding area 3. The photonic crystal is formed on the photonic crystal area by providing the scattering rods 33, that is, a refractive index of the scattering rod 33 is different from a refractive index of the substrate 1, and the scattering rods 33 are periodically and regularly distributed in the photonic crystal area to form a photonic crystal. It should be noted that the scattering rod 33 is provided perpendicular to the surface of the folding area 3 to ensure that the photonic crystal is capable of restricting light from the out-coupling region 4 to transmit along the defect area 31 and the line defects 32.

In the embodiment of the present disclosure, a specific shape of the scattering rod 33 is not specifically limited. The scattering rod 33 may be a cylinder, a triangular prism, a cuboid, etc., which may be determined according to specific situations. Also, in the embodiment of the present disclosure, there is no specific limitation on the shape of distribution of adjacent scattering rods 33. The adjacent scattering rods 33 may be arrayed in a regular triangle, a square, or a rectangle, which is not specifically limited in the embodiment of the present disclosure. Generally, in an embodiment of the present disclosure, the scattering rod 33 is an air column, that is, the photonic crystal is generally formed by etching small holes in the photonic crystal area on the surface of the substrate 1. In practice, in the embodiment of the present disclosure, the material of the scattering rod 33 is not specifically limited, which may be determined according to specific situations. A wavelength range of the light that the photonic crystal is capable of restraining is determined together by a refractive index of the scattering rod 33, a size of the scattering rod 33, a spacing between the scattering rods 33, arrangement of the scattering rods 33, and refractive indices of the scattering rod 33 and the substrate 1. Therefore, the refractive index of the scattering rod 33 needs to meet certain constraints to ensure that light of a specific wavelength may be transmitted in the two-dimensional optical waveguide according to the embodiment of the present disclosure.

In the embodiment of the present disclosure, the photonic crystal has a photonic band gap effect on the light within a working wavelength, thereby ensuring that the light can only be transmitted along the defect area 31 and the line defect 32. Along the axial direction of the defect area 31, light of different functions are transmitted in respective line defects 32 to realize the pupil expansion function. It should be pointed out that mature methods for realizing beam power splitting include controlling the width of the line defect 32, and regulating the scattering rod 33 at an interface of the defect area 31 and the line defect 32, etc., which is not limited in the present disclosure.

Preferably, in an embodiment of the present disclosure, the width of the defect area 31 gradually decreases along a direction from the in-coupling region 2 to a side away from the in-coupling region 2, that is, the width of the defect area 31 gradually decreases along the light transmission direction. By providing the defect area 31 with the above structure, it is ensured that as much light as possible can be transmitted into the line defect 32, and that finally as much light as possible can be transmitted to the out-coupling region 4. Specific width parameters of the defect area 31 may be set according to actual situations, which is not specifically limited in the embodiment of the present disclosure.

Referring to FIG. 2, preferably, in an embodiment of the present disclosure, the out-coupling region 4 is overlapped with the folding area 3. In this case, the out-coupling grating located on the surface of the out-coupling region 4 covers the folding area 3 along a direction perpendicular to paper in FIG. 2, and generally specifically covers line defects 32 and photonic crystal areas at one side of the defect area 31 in the folding area 3. That is, the out-coupling grating specifically covers the area extending from the folding area 3 to the defect area 31. In practice, the out-coupling grating may further cover the defect area 31, which may be determined according to the specific situation, and is not specifically limited here. By overlapping the out-coupling region 4 with the folding area 3, the area proportion of the out-coupling region 4 may be greatly increased.

A two-dimensional optical waveguide is provided according to the embodiment of the present disclosure, where a surface of the substrate 1 is divided into an in-coupling region 2, a folding area 3, and an out-coupling region 4; the folding area 3 is provided with a defect area 31 and at least two line defects 32, the defect area 31 extends from the in-coupling region 2 to a side away from the in-coupling region 2, an end of the line defect 32 is in contact with the defect area 31, the other end of the line defect 32 extends to the out-coupling region 4, and the at least two line defects 32 are distributed along the axis of the defect area 31; a photonic crystal area is defined between adjacent line defects 32 in the folding area 3, between the at least two line defects 32 and the defect area 31, between the at least two line defects 32 and an edge of the folding area 3, and between the defect area 31 and an edge of the folding area 3; the photonic crystal area is provided with multiple scattering rods 33 to form a photonic crystal, and an axis of the scattering rod 33 is perpendicular to a surface of the folding area 3.

Due to the existence of the photonic crystal, the defect area 31 and the line defects 32 will form light guide branches, and the light transmitted to the substrate 1 through the in-coupling region 2 may be transmitted to the out-coupling region 4 through the defect area 31 and the line defects 32 to realize the pupil expansion function. The photonic crystal is capable of completely prohibiting the propagation of light, so that the light may be bent and transmitted at a large angle and in a low-loss way, along the light guide branches, so that the two-dimensional optical waveguide has a higher efficiency of light redirection and exit pupil expansion.

The specific structure of the two-dimensional optical waveguide according to the present disclosure will be described in detail in the following embodiment of the present disclosure.

Figure 3:
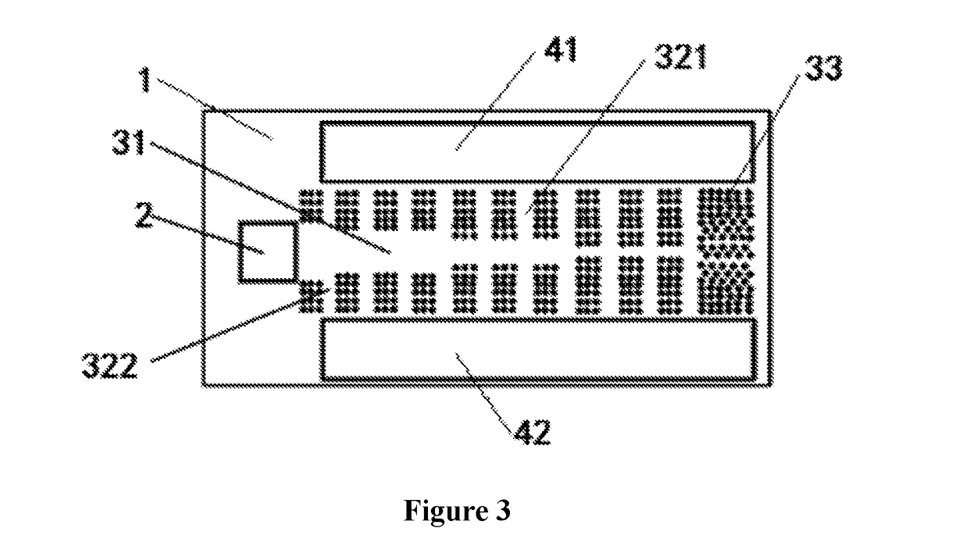
FIG. 3 is a schematic structural diagram of a second specific two-dimensional optical waveguide according to an embodiment of the present disclosure.
Figure 4:
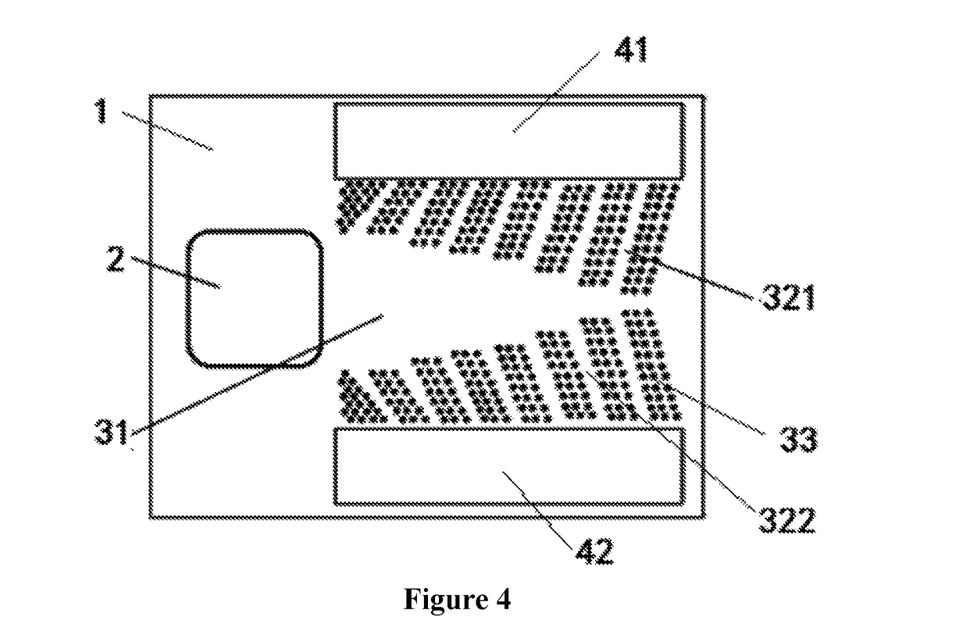
FIG. 4 is a schematic structural diagram of a third specific two-dimensional optical waveguide according to an embodiment of the present disclosure.

Reference is made to FIG. 3 and FIG. 4. FIG. 3 is a schematic structural diagram of a second specific two-dimensional optical waveguide according to an embodiment of the present disclosure; FIG. 4 is a schematic structural diagram of a third specific two-dimensional optical waveguide according to an embodiment of the present disclosure.

Different from the above embodiments of the present disclosure, this embodiment of the present disclosure further specifically limits the structure of the two-dimensional optical waveguide on the basis of the above embodiments of the present disclosure. The rest content has been introduced in detail in the above embodiments of the present disclosure, and is not repeated herein.

Referring to FIG. 3 and FIG. 4, in the embodiment of the present disclosure, the in-coupling region 2 is located at an edge section on a side of a surface of the substrate 1, and the defect area 31 extends from the edge section on this side of the surface of the substrate 1 to an edge section on the other side of the surface of the substrate 1. The out-coupling region 4 includes a first out-coupling region 41 and a second out-coupling region 42 arranged opposite to each other about the axis of the defect area 31. The at least two line defects 32 include a first line defect 321 and a second line defect 322, where the first line defect 321 extends from the defect area 31 to the first out-coupling region 41, and the second line defect 322 extends from the defect area 31 to the second out-coupling region 42.

It should be firstly noted that the in-coupling region 2 is generally located at an edge section of the surface of the substrate 1 to facilitate the image display by an AR device including the two-dimensional optical waveguide according to the embodiment of the present disclosure. In the embodiment of the present disclosure, the in-coupling region 2 is located at an edge section on a side of the surface of the substrate 1, and generally the in-coupling region 2 is located in a middle area of the edge section on the side of the surface of the substrate 1. The defect area 31 extends from the edge section on the side of the surface of the substrate 1, that is, the in-coupling region 2, to an edge section on the other side of the surface of the substrate 1, so that light may extend from the edge section on the side of the surface of the substrate 1 to the edge section on the other side.

The out-coupling region 4 includes a first out-coupling region 41 and a second out-coupling region 42. The first out-coupling region 41 and the second out-coupling region 42 are arranged opposite to each other about the axis of the defect area 31. That is, if the in-coupling region 2 is located on the left side of the surface of the substrate 1, the defect area 31 extends from the left side to the right side. The first out-coupling region 41 is generally located on the upper side of the surface of the substrate 1, and the second out-coupling region 42 is generally located on the lower side of the surface of the substrate 1. Correspondingly, the at least two line defects 32 include a first line defect 321 and a second line defect 322, where the first line defect 321 extends from the defect area 31 to the first out-coupling region 41, so that part of the light is transmitted to the first out-coupling region 41 for imaging, and the second line defect 322 extends from the defect area 31 to the second out-coupling region 42, so that part of the light is transmitted to the second out-coupling region 42 for imaging.

In the embodiment of the present disclosure, the arrangement of the first line defect 321, the second line defect 322, the first out-coupling region 41, and the second out-coupling region 42 transmits the light from the in-coupling region 2 to both sides, so as to display an image. Specifically, the line defects 32 are any one or any combination of the following: straight-line-shaped line defects 32 perpendicular to the axis of the defect area 31, oblique-line-shaped line defects 32 non-perpendicular to the axis of the defect area 31, and polyline-shaped line defects 32. The line defects 32 may be centered at the axis of the defect area 31 and extend in a direction perpendicular to the axis of the defect area 31 to form straight-line-shaped line defects 32; the line defect 32 may alternatively be centered at the axis of the defect area 31 and extend along oblique lines to form oblique-line-shaped line defects 32; the line defects 32 may also be polyline-shaped line defects 32 to transmit light to the out-coupling region 4. In practice, in the embodiment of the present disclosure, the specific shape of the line defect 32 is not specifically limited, which may be determined according to the specific situation.

It should be noted that in the embodiment of the present disclosure, the in-coupling region 2 may be located on the left or right side of the surface of the substrate 1, so that light is transmitted in the horizontal direction; the in-coupling region 2 may alternatively be located on the upper or lower side of the surface of the substrate 1, so that the light is transmitted in the vertical direction, which is not specifically limited in the embodiment of the present disclosure.

The two-dimensional optical waveguide according to the embodiment of the present disclosure has an in-coupling region 2 located near the central axis of the two-dimensional optical waveguide, and is suitable for an AR glasses with projectors installed on glasses legs on both sides of the glasses, which highly matches the shape of glasses in the conventional art, so there is no need to additionally design a shape for the glasses, which is widely applicable and versatile.

The specific structure of a two-dimensional optical waveguide according to the present disclosure will be described in detail in the following embodiment of the present disclosure.

Figure 5:
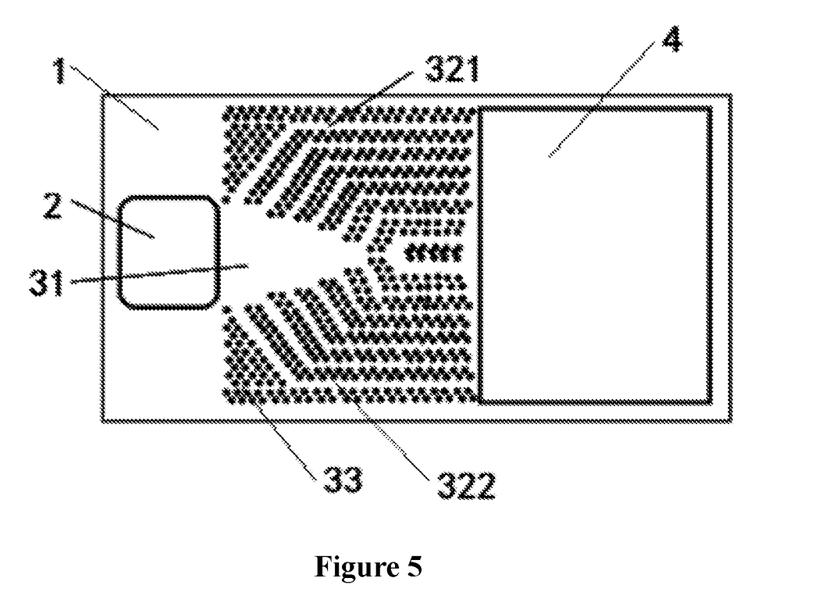
FIG. 5 is a schematic structural diagram of a fourth specific two-dimensional optical waveguide according to an embodiment of the present disclosure.

Reference is made to FIG. 5, which is a schematic structural diagram of a fourth specific two-dimensional optical waveguide according to an embodiment of the present disclosure.

Different from the above embodiments of the present disclosure, this embodiment of the present disclosure further specifically limits the structure of the two-dimensional optical waveguide on the basis of the above embodiments of the present disclosure. The rest content has been introduced in detail in the above embodiments of the present disclosure, and is not repeated here.

Referring to FIG. 5, in the embodiment of the present disclosure, the in-coupling region 2 is located at an edge section on a side of the surface of the substrate 1, the out-coupling region 4 is located on the other side of the surface of the substrate 1; the defect area 31 extends from the in-coupling region 2 to the out-coupling region 4; the at least two line defects 32 include a first line defect 321 located at a side of the defect area 32 and a second line defect 322 located at the other side of the defect area 31, and the line defects 32 are polyline-shaped line defects 32.

The in-coupling region 2 is located at an edge section on a side of the surface of the substrate 1, and the out-coupling region 4 is located on the other side of the surface of the substrate 1. That is, the in-coupling region 2 and the out-coupling region 4 are arranged opposite to each other on the surface of the substrate 1. In this case, the defect area 31 extends from the in-coupling region 2 to the out-coupling region 4, and the line defects 32 are polyline-shaped line defects 32. An end of the line defect 32 is in contact with the defect area 31, and the line defect 32 zigzags towards the out-coupling region 4 and finally extends to the out-coupling region 4 to transmit light to the out-coupling region 4.

Specifically, the at least two line defects 32 include a first line defect 321 and a second line defect 322. The first line defect 321 and the second line defect 322 are respectively located at both sides of the line defect 32, so as to transmit light to the out-coupling region 4 from both sides of the defect area 31.

It should be noted that in the embodiment of the present disclosure, the in-coupling region 2 may be located on the left or right side of the surface of the substrate 1, so that light is transmitted in the horizontal direction; the in-coupling region 2 may alternatively be located on the upper or lower side of the surface of the substrate 1, so that the light is transmitted in the vertical direction, which is not specifically limited in the embodiment of the present disclosure.

The two-dimensional optical waveguide according to the embodiment of the present disclosure has an in-coupling region 2 located near the central axis of the two-dimensional optical waveguide, and is suitable for an AR glasses with projectors installed on glasses legs on both sides of the glasses, which highly matches the shape of glasses in the conventional art, so there is no need to additionally design a shape for the glasses, which is widely applicable and versatile.

The specific structure of a two-dimensional optical waveguide according to the present disclosure will be described in detail in the following embodiment of the present disclosure.

Figure 6:
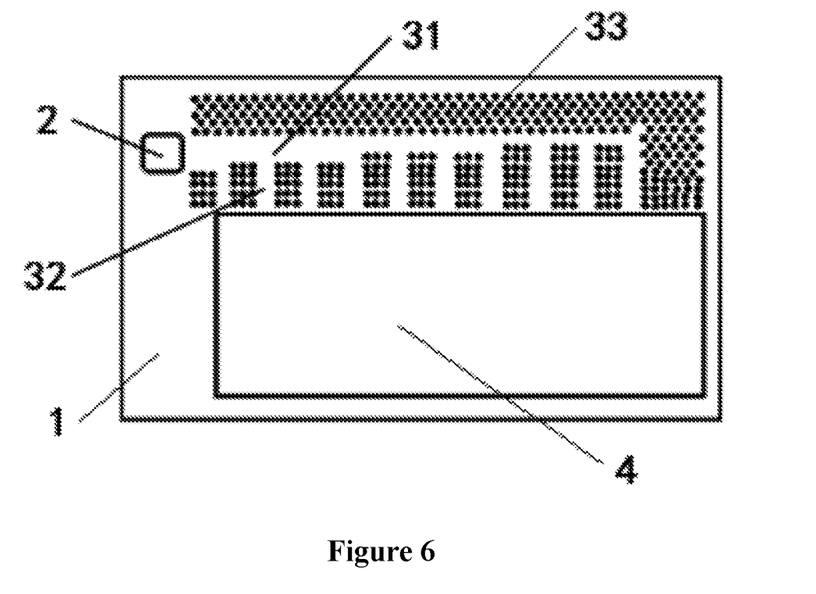
FIG. 6 is a schematic structural diagram of a fifth specific two-dimensional optical waveguide according to an embodiment of the present disclosure.
Figure 7:
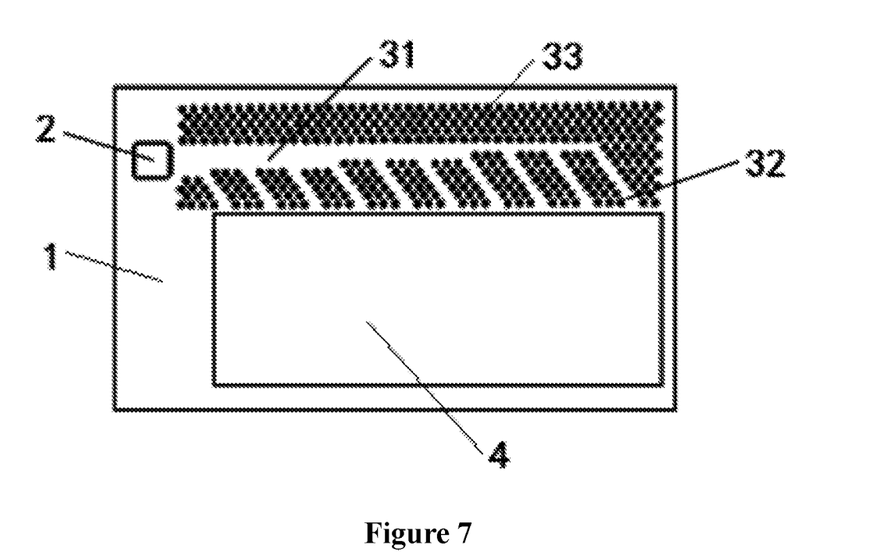
FIG. 7 is a schematic structural diagram of a sixth specific two-dimensional optical waveguide according to an embodiment of the present disclosure.

Reference is made to FIG. 6 and FIG. 7, where FIG. 6 is a schematic structural diagram of a fifth specific two-dimensional optical waveguide according to an embodiment of the present disclosure, and FIG. 7 is a schematic structural diagram of a sixth specific two-dimensional optical waveguide according to an embodiment of the present disclosure.

Different from the above embodiments of the present disclosure, this embodiment of the present disclosure further specifically limits the structure of the two-dimensional optical waveguide on the basis of the above embodiments of the present disclosure. The rest content has been introduced in detail in the above embodiments of the present disclosure, and is not repeated here.

Referring to FIG. 6 and FIG. 7, in the embodiment of the present disclosure, the in-coupling region 2 is located at a corner edge section on a side of the surface of the substrate 1, and the out-coupling region 4 is located at a side of the defect area 31.

The substrate 1 is generally in a rectangular shape or other shapes similar to the rectangular shape such as a rounded rectangle. In this case, an edge section of the substrate 1 specifically includes four corner edge sections located at four corners. In the embodiment of the present disclosure, the in-coupling region 2 is located at a corner edge section on a side of the surface of the substrate 1. Correspondingly, the defect area 31 extends along a side edge of the surface of the substrate 1. In this case, the in-coupling region 2 is generally arranged only at one side of the defect area 31, and the line defect 32 extends from the defect area 31 to the in-coupling region 2 to transmit light to the in-coupling region 2 for imaging. Moreover, the in-coupling region 2 and the defect area 31 are generally located at an edge of the field of view of an AR device, so that the two-dimensional optical waveguide according to the embodiment of the present disclosure will not affect the sight line of a user.

Specifically, the line defects 32 are any one or any combination of the following: straight-line-shaped line defects 32 perpendicular to the axis of the defect area 31, oblique-line-shaped line defects 32 non-perpendicular to the axis of the defect area 31, and polyline-shaped line defects 32. The line defects 32 may be centered at the axis of the defect area 31 and extend in a direction perpendicular to the axis of the defect area 31 to form straight-line-shaped line defects 32; the line defect 32 may alternatively be centered at the axis of the defect area 31 and extend along oblique lines to form oblique-line-shaped line defects 32; the line defects 32 may also be polyline-shaped line defects 32 to transmit light to the out-coupling region 4. In practice, in the embodiment of the present disclosure, the specific shape of the line defect 32 is not specifically limited, which may be determined according to the specific situation.

It should be noted that in the embodiment of the present disclosure, the light may be transmitted in the horizontal direction or in the vertical direction, which is not specifically limited in the embodiment of the present disclosure.

In the two-dimensional optical waveguide according to the embodiment of the present disclosure, the in-coupling region 2 is arranged at a side of the folding area 3, and the defect area 31 extends along a side edge of the substrate 1. Projectors may be provided on glasses legs on both sides of the glasses or provided above the glasses lenses, which matches the shape of glasses in the conventional art, so there is no need to additionally design a shape for the glasses, which is widely applicable and versatile.

The specific structure of a two-dimensional optical waveguide according to the present disclosure will be described in detail in the following embodiment of the present disclosure.

Figure 8:
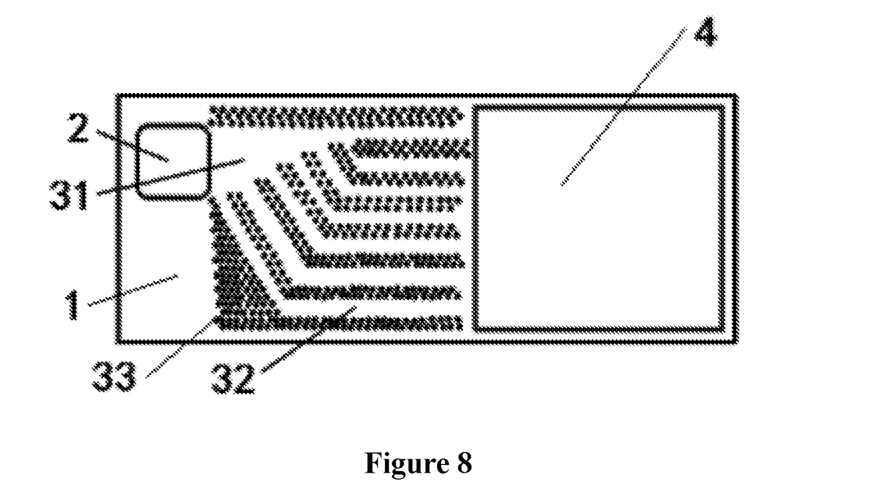
FIG. 8 is a schematic structural diagram of a seventh specific two-dimensional optical waveguide according to an embodiment of the present disclosure.

Reference is made to FIG. 8, which is a schematic structural diagram of a seventh specific two-dimensional optical waveguide according to an embodiment of the present disclosure.

Different from the above embodiments of the present disclosure, the embodiment of the present disclosure further specifically limit the structure of the two-dimensional optical waveguide on the basis of the above embodiments of the present disclosure. The rest content has been introduced in detail in the above embodiments of the present disclosure, and is not repeated here.

Referring to FIG. 8, in the embodiment of the present disclosure, the in-coupling region 2 is located at a corner edge section on a side of the surface of the substrate 1, and the out-coupling region 4 is located on the other side of the surface of the substrate 1. The defect area 31 extends from the in-coupling region 2 to the out-coupling region 4 and the line defects 32 are polyline-shaped line defects 32.

The substrate 1 is generally in a rectangular shape or other shapes similar to the rectangular shape such as a rounded rectangle. In this case, an edge section of the substrate 1 specifically includes four corner edge sections located at four corners. In the embodiment of the present disclosure, the in-coupling region 2 is located at a corner edge section on a side of the surface of the substrate 1. Correspondingly, the defect area 31 extends along a side edge of the surface of the substrate 1. In an embodiment of the present disclosure, the in-coupling region 2 is located at a corner edge section on a side of the surface of the substrate 1, and the out-coupling region 4 is located on the other side of the surface of the substrate 1. That is, the in-coupling region 2 and the in-coupling region 2 are arranged opposite to each other on the surface of the substrate 1. In this case, the defect area 31 extends from the in-coupling region 2 to the out-coupling region 4, and the line defects 32 are polyline-shaped line defects 32. An end of the line defect 32 is in contact with the defect area 31, and the line defect 32 zigzags towards the out-coupling region 4 and finally extends to the out-coupling region 4 to transmit light to the out-coupling region 4. In an embodiment of the present disclosure, the in-coupling region 2 and the defect area 31 are generally located at an edge of the field of view of an AR device, so that the two-dimensional optical waveguide according to the embodiment of the present disclosure will not affect the sight line of a user.

It should be noted that in the embodiment of the present disclosure, the light may be transmitted in the horizontal direction or in the vertical direction, which is not specifically limited in the embodiment of the present disclosure.

The two-dimensional optical waveguide according to the embodiment of the present disclosure has an in-coupling region 2 provided at a side of the folding area 3, and the defect area 31 extends along a side edge of the substrate 1. Projectors may be provided on glasses legs on both sides of the glasses or provided above the glasses lenses, which matches the shape of glasses in the conventional art, so there is no need to additionally design a shape for the glasses, which is widely applicable and versatile.

A specific two-dimensional optical waveguide is provided below. In an embodiment of the present disclosure, a surface of the substrate 1 is divided into an in-coupling region 2, a folding area 3 and an out-coupling region 4. The in-coupling region 2 is provided at the left side of the folding area 3, and a light beam perpendicularly incident to the planar in-coupling region 2 of the two-dimensional optical waveguide 2 becomes a light beam propagating from the in-coupling region 2 to the right side in the waveguide; a photonic crystal with a preset structure is provided in the folding area 3, where the photonic crystal is a series of cylindrical air columns specially arranged on a waveguide plane. The holes are distributed in a horizontal array, and the photonic crystal structure is a uniform structure with the same thickness as the waveguide in a direction perpendicular to the waveguide plane; the folding area 3 is provided with a defect area 31 with a width gradually decreasing from left to right, where at least two line defects 32 from left to right are derived downwards from the defect area 31, where the line defects 32 are oblique-line-shaped. The defect area 31 and line defects 32 play the role of light guide. The light beam propagating from left to right in the folding area 3 is divided according to specific powers and part of the light propagates into the line defects 32, so as to realize the continuous downward propagation of the whole beam. By designing the defect area 31 and the bandwidth of the air columns, light in the defect area 31 is split to the line defects 32. In the embodiment, 10 downward line defects 32 are derived from the defect area 31. In the embodiment, wavelength of the light is 640 nm, the two-dimensional optical waveguide is made of a polymer with a relative permittivity of 20, the duty ratio of holes on the folding area 3 is 0.492, and the splitting ratio is 75:1.5, which is obtained by calculation and simulation. The defect area 31 has the same width as the in-coupling region 2, which is 5 mm, and the length of the defect area 31 is the same as the out-coupling region 4, which is 30 mm; the width of the line defect 32 is 5 mm; the whole width of the folding area 3 is 40 mm, and the out-coupling are 4 is overlapped with the folding area 3.

A virtual and real optical beam combiner according to the present disclosure is described as following. Cross reference may be made between the structure of the virtual and real optical beam combiner described below and that of the two-dimensional optical waveguide described above.

A virtual and real optical beam combiner is provided according to an embodiment of the present disclosure, which includes the two-dimensional optical waveguide according to any one of the above embodiments of the present disclosure and generally further includes a protective glass on a surface of the two-dimensional optical waveguide and an allochronic element that is in communication connection with the two-dimensional optical waveguide. For the specific structures of the protective glass and the allochronic element, reference may be made to the conventional art, which are not repeated here. It should be pointed out that the present disclosure does not specifically limit the protective glass of the optical waveguide and the allochronic element, etc., nor does it specifically limit the virtual and real optical combiner (Combiner), as long as the two-dimensional optical waveguide according to in the present disclosure is included in the virtual and real optical beam combiner (Combiner). For the rest content, reference may be made to the conventional art, and no further description is given herein.

An AR device according to the present disclosure is introduced in the following. Cross reference may be made between the structure of the AR device described below and that of the two-dimensional optical waveguide described above.

An AR device according to an embodiment of the present disclosure includes the two-dimensional optical waveguide according to any one of the above embodiments, and generally further includes a projection display module, a calculation module, and a sensing module. The sensing module is configured to obtain orientation information, and the calculation module is configured to control an image source in the projection display module to generate a corresponding image according to the orientation information, where the image is transmitted into the in-coupling region 2 through the coupling grating.

The sensing module is configured to sense orientation information, and the calculation module is configured to control the image source in the projection display module to generate a corresponding image according to the orientation information, where the image is transmitted into the in-coupling region 2 through the coupling grating. In practice, the sensing module generally includes many devices, such as a camera, an inertial measurement unit (IMU) and other sensors to measure different parameters. The specific structure and specific process of the sensing module may be set according to the actual situation, which is not specifically limited here. It should be pointed out that the embodiment of the present disclosure does not specifically limit the image source in the projection display unit. Preferably, the image source in the projection display unit may be any one or more of liquid crystal on silicon (LCoS), digital mirror device (DMD), organic light emitting diode (OLED), micro light emitting diode (microLED), and location based service (LBS). The image source is equipped with a corresponding optical design and an optical transfer prism to input an enlarged image into the in-coupling region 2 of the waveguide.

It should further be pointed out that the present disclosure does not specifically limit the AR device. Preferably, the AR device is any one or more of AR glasses, AR helmet device, and AR head-up display (HUD).

The embodiments in the description are described in a progressive manner. Each of the embodiments mainly focuses on its differences from other embodiments, and reference may be made among these embodiments with respect to the same or similar parts.

It is further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above based on functions. Whether the function is executed in a hardware way or in a software way depends on disclosures of the technical solution and design constraint conditions. Those skilled in the art can use different method for each disclosure to realize the described function, and this is not considered to be beyond the scope of the present disclosure.

The steps of the methods or algorithms described in conjunction with the embodiments of the present disclosure can be implemented with hardware, software modules executed by a processor, or a combination thereof. The software modules may reside in a random access memory (RAM), an internal memory, a read only memory (ROM), an electric programmable ROM, an electric-erasable programmable ROM, a register, a hard disk, a portable disk drive, CD-ROM, or other types of storage media well known in the technical field.

Finally, it should be noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Unless expressively limited otherwise, the statement "comprising (including) a/an . . . " preceding an element does not exclude a case where a process, method, article or device that includes the element further includes additional identical elements.

A two-dimensional optical waveguide, a virtual and real optical beam combiner and an AR device according to the present disclosure are described in detail above. Specific examples are used in this specification to illustrate the principle and implementation of the present disclosure. The description of the above embodiments is only used to facilitate understanding of the method and core concept of the present disclosure. It should be noted that, for those skilled in the art, many modifications and improvements may be made to the present disclosure without departing from the principle of the present disclosure, and these modifications and improvements are also deemed to fall into the protection scope of the present disclosure defined by the claims.

The invention claimed is:

1. A two-dimensional optical waveguide, comprising a substrate, an in-coupling grating and an out-coupling grating, wherein:
    a surface of the substrate is divided into an in-coupling region, a folding area, and an out-coupling region, the folding area is provided with a defect area and at least two line defects, the defect area extends from the in-coupling region to a side away from the in-coupling region, an end of each line defect is in contact with the defect area, the other end of each line defect extends to the out-coupling region, and the at least two line defects are distributed along an axis of the defect area;
    a photonic crystal area is provided between adjacent line defects in the folding area, between the at least two line defects and the defect area, between the at least two line defects and an edge of the folding area, and between the defect area and an edge of the folding area, the photonic crystal area is provided with a plurality of scattering rods to form a photonic crystal, and an axis of each of the scattering rods is perpendicular to a surface of the folding area; and
    the in-coupling grating is located on a surface of the in-coupling region, and the out-coupling grating is located on a surface of the out-coupling region.

2. The two-dimensional optical waveguide according to claim 1, wherein a width of the defect area gradually decreases along a direction from the in-coupling region to the side away from the in-coupling region.

3. The two-dimensional optical waveguide according to claim 2, wherein the in-coupling region is located at an edge section on a side of the surface of the substrate, the defect area extends from the edge section on the side of the surface of the substrate to an edge section on the other side of the surface of the substrate, the out-coupling region comprises a first out-coupling region and a second out-coupling region arranged opposite to each other about the axis of the defect area, the at least two line defects comprise a first line defect and a second line defect, the first line defect extends from the defect area to the first out-coupling region, and the second line defect extends from the defect area to the second out-coupling region.

4. The two-dimensional optical waveguide according to claim 3, wherein the at least two line defects are any one or any combination of the following:
    straight-line-shaped line defects perpendicular to the axis of the defect area, oblique-line-shaped line defects non-perpendicular to the axis of the defect area, and polyline-shaped line defects.

5. The two-dimensional optical waveguide according to claim 2, wherein the in-coupling region is located at an edge section on a side of the surface of the substrate, the out-coupling region is located on the other side of the surface of the substrate, the defect area extends from the in-coupling region to the out-coupling region, the at least two line defects comprise a first line defect located at a side of the defect area and a second line defect located at the other side of the defect area, and the at least two line defects are polyline-shaped line defects.

6. The two-dimensional optical waveguide according to claim 2, wherein the in-coupling region is located at a corner edge section on a side of the surface of the substrate, and the out-coupling region is located at a side of the defect area.

7. The two-dimensional optical waveguide of claim 6, wherein the at least two line defects are any one or any combination of the following:
    straight-line-shaped line defects perpendicular to the axis of the defect area, oblique-line-shaped line defects non-perpendicular to the axis of the defect area, and polyline-shaped line defects.

8. The two-dimensional optical waveguide of claim 2, wherein the in-coupling region is located at a corner edge section on a side of the surface of the substrate, the out-coupling region is located on the other side of the surface of the substrate, the defect area extends from the in-coupling region to the out-coupling region, and the at least two line defects are polyline-shaped line defects.

9. The two-dimensional optical waveguide according to claim 1, wherein a length of the defect area ranges from 5 mm to 50 mm, inclusive.

10. The two-dimensional optical waveguide of claim 1, wherein a width of each line defect ranges from 0.1 mm to 5 mm, inclusive.

11. The two-dimensional optical waveguide according to claim 1, wherein the out-coupling region is overlapped with the folding area.

12. A virtual and real optical beam combiner, comprising the two-dimensional optical waveguide according to claim 1.

13. An AR device, comprising the two-dimensional optical waveguide according to claim 1.

14. The two-dimensional optical waveguide according to claim 2, wherein the out-coupling region is overlapped with the folding area.

15. The two-dimensional optical waveguide according to claim 3, wherein the out-coupling region is overlapped with the folding area.

16. The two-dimensional optical waveguide according to claim 4, wherein the out-coupling region is overlapped with the folding area.

17. The two-dimensional optical waveguide according to claim 5, wherein the out-coupling region is overlapped with the folding area.

18. The two-dimensional optical waveguide according to claim 6, wherein the out-coupling region is overlapped with the folding area.

19. The two-dimensional optical waveguide according to claim 7, wherein the out-coupling region is overlapped with the folding area.

20. The two-dimensional optical waveguide according to claim 8, wherein the out-coupling region is overlapped with the folding area.

* * * * *